Dec. 6, 1960   J. H. PLUMMER   2,962,755
APPARATUS FOR PRODUCING CONTINUOUS GLASS FIBERS
Filed Jan. 2, 1957
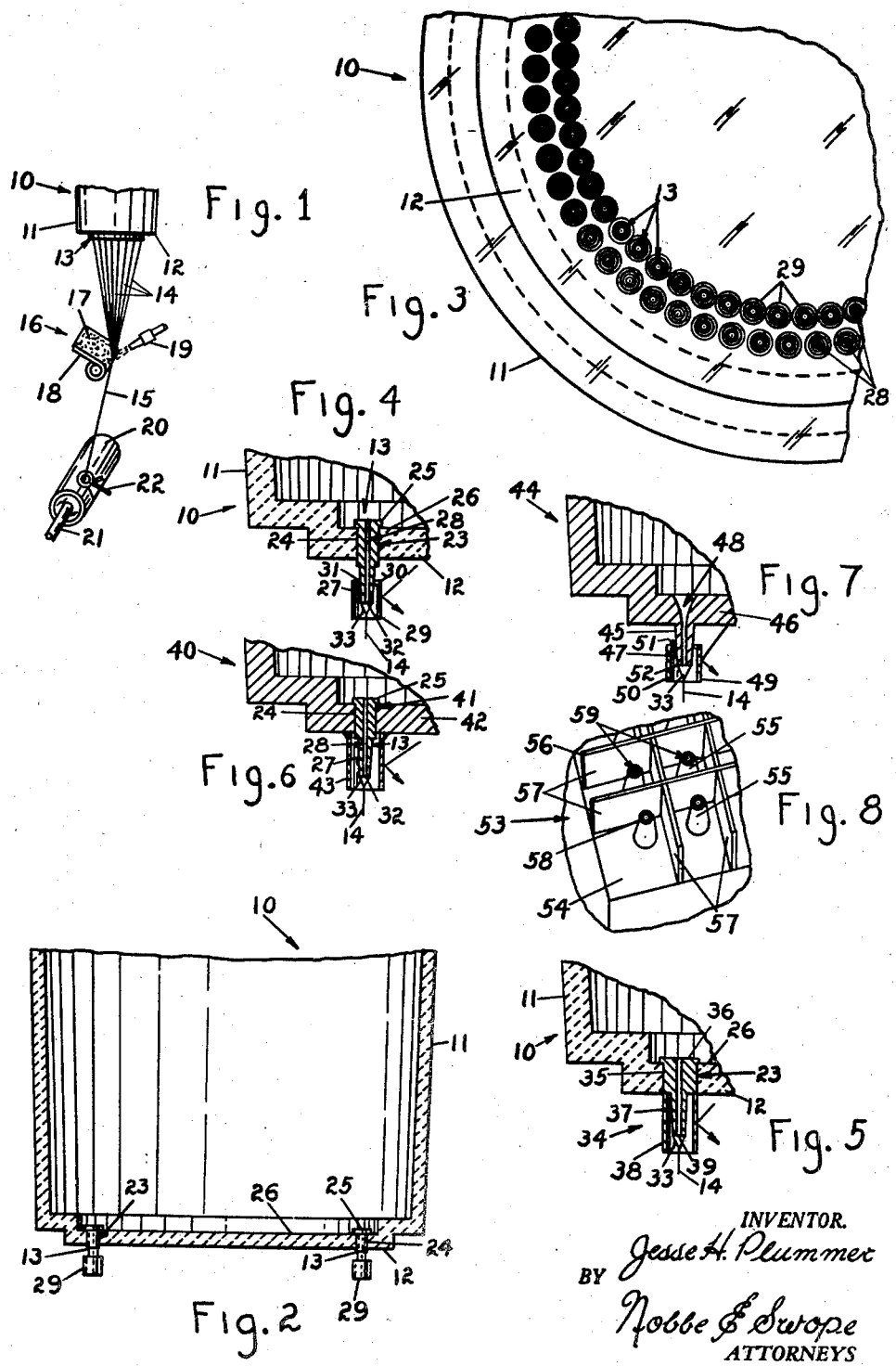
INVENTOR.
Jesse H. Plummer
BY
Nobbe & Swope
ATTORNEYS

United States Patent Office 2,962,755
Patented Dec. 6, 1960

2,962,755

APPARATUS FOR PRODUCING CONTINUOUS GLASS FIBERS

Jesse H. Plummer, Toledo, Ohio, assignor, by mesne assignments, to Johns-Manville Fiber Glass Inc., Cleveland, Ohio, a corporation of Delaware Filed Jan. 2, 1957, Ser. No. 632,067

17 Claims. (Cl. 18—8)

This invention relates to the production of glass fibers and more specifically to an apparatus for producing continuous glass fibers.

The so-called textile or continuous glass fibers, used in the weaving of cloth and for other purposes, are conventionally manufactured by attenuating a plurality of small streams of molten glass into fine fibers of continuous length. The fibers are drawn together over a suitable guide to form a strand and wound as such as over a rapidly rotating drum which provides the attenuating force.

According to one method of operation, a body of molten glass is established within a melting chamber, provided in a wall thereof with small orifices or tips through which the molten glass is exuded as small streams. The small streams are attenuated at high speed into fibers as they exude from the orifices, a short distance beyond the outer surface of the molten glass retaining wall. Since the aforementioned wall is a high level producer of radiant energy, fiber attenuation takes place in a zone of intense radiant energy. The radiant energy is sufficiently intense in many instances to cause the fibers, which are extremely small and of delicate nature before they solidify, to be remelted or broken. This has long been a perplexing problem in the production of continuous glass fibers, causing machine down time and resultant decreased efficiency of operation.

The purpose of this invention is to shield the fiber attenuation zone from the radiant energy produced by the wall of the melting chamber through which the molten glass streams are exuded. This is accomplished by placing a heat-reflective shield between the wall of the melting chamber and the ends of the tips or orifices through which the glass is exuded. Thus the glass cones which are formed at the termini of the tips from which the fibers are produced, are shielded from radiant energy from the melting chamber.

The radiation shield of the present invention is a small tubular or multi-sided member positioned in surrounding coaxial relationship with the tips or orifices through which the molten glass streams are exuded, to shield the termini thereof from the radiant energy of the adjacent melting chamber wall.

The radiation shield also provides an extended surface area through which heat by conduction from the melting chamber to the nozzle is reduced.

There are prior processes and devices in which temperature control of the glass mass at the point of attenuation is attempted by absorbing the heat from the nozzle tip with liquid coolants placed in areas adjacent to the nozzle. In such arrangements the liquid coolants tend to absorb heat from the glass melting chamber as well as from the nozzle tips.

There are other processes and devices in which melting takes place in the nozzle and in which it is contemplated to insulate the nozzle tip from the direct heat of the heating chamber. However, in such arrangements the insulation is placed contiguous to the source of heat and to the nozzle at the point where the nozzle exits the heating chamber. While such insulators may reduce the rate of heat conduction, nevertheless, heat is conducted to the nozzle.

All of these prior processes and devices contemplate principles and modes of heat transfer different from the subject invention. The highly conductive and reflective metal shield of the subject invention reflects a great portion of the heat radiated to it from the melting chamber bottom and also reduces the amount of heat conducted to the nozzle or tip by diverting a portion to the extended surface of the shield.

It is therefore an important object of the present invention to provide an improved apparatus for the production of continuous glass fibers.

It is another object to provide an improved apparatus for cone shielding in the production of continuous glass fibers without the need of insulation.

A further object is to provide an improved apparatus for cone cooling in the production of continuous glass fibers without the use of liquid coolants.

A further object is to provide a novel shielded tip for a glass melting chamber adapted to the production of continuous glass fibers.

Other objects and advantages of the invention will become more apparent during the course of the following description when taken in connection with the accompanying drawings.

In the drawings wherein like numerals are employed to designate like parts throughout the same:

Fig. 1 is a perspective view of an apparatus for the production of continuous fibers from heat-softenable materials;

Fig. 2 is a partial elevational sectional view of a melting chamber adapted for use in the apparatus of Fig. 1;

Fig. 3 is a fragmentary bottom plan view of the melting chamber having a double circle of orifices.

Fig. 4 is a fragmentary section view showing a tip of the invention as applied to a melting chamber fabricated of refractory clay;

Fig. 5 is a section view of another embodiment of the invention as applied to a melting chamber fabricated of refractory clay;

Fig. 6 is a fragmentary section view showing a tip of the invention as applied to a melting chamber made of metal;

Fig. 7 is another embodiment of the invention as applied to a metal melting chamber; and Fig. 8 is a bottom fragmentary perspective view of a radiant energy shield of the invention as adapted to a rectangular glass melting chamber.

As shown in Fig. 1 there is illustrated an apparatus adapted for the production of continuous glass fibers which includes a glass melting pot 10 suitably fabricated of circular section and suitably made from a high temperature-resistant precious metal alloy or refractory clay. The pot includes a side wall 11 of cylindrical configuration with its axis vertically disposed and a circular base 12, joined to the bottom of the side wall. The melting pot is adapted to be heated by suitable means whereby glass forming materials placed therein can be rendered molten.

Molten glass produced within the melting pot 10 by the heat applied thereto exudes downwardly through a plurality of tips 13 in the base 12 as small molten streams. These streams are attenuated and drawn out into fine fibers 14 which are gathered together as a strand 15 by means of a fiber gathering guide 16. The guide is suitably comprised of a felt pad 17 stretched over a shaped metal holder 18. A liquid sizing material is applied to the strand at the guide from a conduit 19 for reducing interabrasion between the fibers 14 and for binding the fibers into a coherent strand 15.

The strand is directed downwardly and is wound on a rotatable tube 20 supported upon a rotatable shaft 21. The strand is directed back and forth across the face of the tube by a traverser 22 in the manner of a spool of household sewing thread.

Fig. 2 illustrates in partial vertical cross section one form of a glass melting chamber which is adapted to be used in the apparatus of Fig. 1. It will be seen that the melting chamber is suitably made with a generally cylindrical side wall 11 and a horizontally disposed base 12 of circular shape. Metal or refractory clay are suitable materials from which the chamber can be fabricated. The base 12 is provided with a plurality of apertures 13 arranged in concentric circular array. These apertures are fitted with corrosion resistant metal tip inserts 13 of the invention. Fig. 3 shows in fragmentary bottom plan view the concentric arrangement of the apertures 23 and tips 13, positioned adjacent and around the periphery of the base of the melting chamber. It will be noted that in Fig. 3 there are two circles of tips. However, any number of tip circles can be employed depending upon the particular type of strand to be produced and the number of fibers the strand is to contain.

In Figs. 4 and 5 there are illustrated tips of the invention as applied to melting chambers fabricated of a refractory material, such as refractory clay, sillimanite or the like. As shown in Fig. 4 the melting chamber 10 is provided in its base 12 with an aperture 23 into which is inserted a cylindrical tip member 13, fabricated of a corresion resistant metal. The tip comprises a main body portion 24 of circular section and having a diameter adapted to fit tightly into the aperture 23 of the base of the melting chamber. The upper end 24 of the tip terminates in a circular shoulder 25 which abuts against the inside surface 26 of the bottom of the melting chamber and thus positions the tip with respect to the bottom of the melting chamber. The lower end of the tip terminates in an inverted frusto-conical point 27. A cylindrical bore 28 extends coaxially through the tip and is of small diameter and adapted to convey molten glass as a small stream out of and beyond the base of the melting chamber. A tubular shield 29, which is open at the bottom and which is provided with a top 30 having an aperture 31 therein is press-fitted upon the frusto-conical point of the tip so that it extends downwardly a short distance beyond the terminus 32 of the tip. Thus the cone of glass 33, formed at the terminus of the tip from the molten glass stream exuded through the bore and from which a fiber 14 is attenuated, is protected from radiant heat emanating from the bottom of the melting chamber as shown by the arrow of Fig. 4.

As shown in Fig. 5 another embodiment of the invention illustrated, which is also adapted to be employed with a melting chamber fabricated of refractory clay. In this embodiment the tip 34 is comprised of a main body portion 35 of circular section and having a diameter adapted to be fitted tightly into the aperture 23 of the base 12 of the melting chamber 10. The upper end of such body portion 35 terminates in a circular shoulder 36 which abuts against the inside surface 26 of the bottom 12 of the melting chamber in the manner of the shoulder illustrated in the embodiment of Fig. 4, to position the tip assembly with respect to the bottom of the melting chamber. The body portion 35 terminates at its bottom end in a downwardly extending frusto-conical point 37 which is formed coaxially of the body portion but which has its outer downwardly tapering surface spaced inwardly a short distance from the periphery of the body member. The tip assembly also includes a downwardly extending tubular shield element 38 which has an outside diameter approximately equivalent to the outside diameter of the body portion and which extends downwardly in coaxial relation to the body portion and projects a short distance beyond the terminus 39 of the frusto-conical point 37. Thus the cone of glass 33 from which the fiber 14 is formed is protected from radiant energy emanating from the bottom of the melting chamber.

The embodiment illustrated in Fig. 5 is also adapted to be employed with a melting chamber fabricated of metal. When so used the bottom of the melting chamber is provided with an aperture of appropriate size adapted to mate with the diameter of the main body portion of the tip assembly.

Figs. 6 and 7 illustrate modifications of the invention as applied to melting chambers fabricated of metal. In Fig. 6 the melting chamber 40 is provided with an aperture 41 in its base 42 into which a tip 13 is adapted to be inserted. The tip includes a main body portion 24, suitably of circular section which terminates at its upper end in a circular shoulder 25, adapted to position the tip with relation to the base of the melting chamber. This tip unit, like the tip of Fig. 4, terminates at its bottom end in a downwardly converging frusto-conical point 27. The tip is provided with a coaxial bore 28 through which a small stream of molten glass is adapted to be excluded. The radiation shield is a cylindrical tubular element 43 which is secured at its upper end as by welding to the base of the melting chamber in coaxial relation around the tip. The cylindrical shield element extends downwardly a short distance beyond the tip terminus 32 to protect the cone of glass 33 which forms at the terminus from radiation from the base of the melting chamber.

The shield, being highly conductive and in contact with the base 12, also serves to dissipate some of the heat which would normally be conducted through the main body portion 24 of tip 13 to the tip terminus 32.

In Fig. 7 the melting chamber 44 is also fabricated of metal, but unlike the melting chamber of Fig. 6 has the tip 45 formed integrally with the base 46 thereof. The tip takes the shape of a downwardly projecting frusto-conical point 47 which is provided with a bore 48 through which a small molten stream of glass is adapted to be exuded. The heat-resistant shield 49 is similar to that shown in Fig. 4 and comprises a tubular body 50 which is open at the base but closed at the top except for a circular aperture 51 whereby it is adapted to be press fitted or welded upon the frusto-conical wall of the point 47. The body 50 of the shield extends downwardly a short distance beyond the terminus 52 of the tip to protect the cone of glass 33 formed thereat from receiving radiant energy emanating from the base of the melting chamber.

Radiation shields of the present invention are also adapted for use with melting chambers fabricated of rectangular cross section. Such a rectangular melting chamber is shown in Fig. 8, which also illustrates another embodiment of the invention. The melting chamber 53 is fabricated of metal and is provided with a base 54 having a plurality of tips 55 formed integrally therein in the manner illustrated for the circular metal melting chamber of Fig. 7. In Fig. 8 however, the radiation shield 56 of the invention comprises a plurality of narrow plate members 57 which are positioned with their top edges adjacent the base 54 of the melting chamber. The plate members are fabricated in the form of a waffle or egg-crate patterned baffle. The plates 57 are of sufficient width so that their lower edges extend a short distance beyond the termini 58 of the tips 55 and thereby shield adjacent cones of glass formed at said termini from each other and also shield the cones from radiation emanating from the base of the melting chamber. The tips are provided with cylindrical bores 59 in the manner of the embodiment shown in Fig. 7 through which small streams of glass are adapted to be exuded for formation of fibers as described hereinbefore.

In addition to the fact that the present invention provides means for shielding the glass cones from radiation from the melting chamber, it also provides means for shielding the cone against "looking at each other." That is to say, radiant energy from one cone is prevented from being transmitted directly to another cone.

Thus it will be seen that the present invention provides individual cone shielding for the production of continuous glass fibers. The invention in its various modifications is adapted to use with tip sections which are formed integrally in metal glass melting chambers and also as individual tip inserts adapted to be placed in apertures in the bases of melting chambers fabricated of materials such as refractory clay, sillimanite and others.

It is to be understood that the form of the invention herewith shown and described is to be taken as a preferred embodiment of the same, but that various changes in shape, size and arrangement of parts may be resorted to without departing from the spirit of the invention or the scope of the subjoined claims.

I claim:

1. A glass melting chamber having a wall adapted to contain molten glass, said wall having a projection extending externally of said chamber and defining an orifice through which molten glass is exuded, and a metallic heat reflective shield circumposing a peripheral area greater than the thickness of the metal comprising said shield, including the outer extremity of said projection, said shield also being in spaced and coaxial relation with said projection.

2. A melting chamber as defined in claim 1, wherein said heat reflective shield is fabricated of a metal of high reflectivity and low emissivity as compared to said wall.

3. A melting chamber as defined in claim 1, wherein said heat reflective shield is fabricated of an alloy of platinum.

4. A glass melting chamber having a wall adapted to contain molten glass, an orifice in said wall through which molten glass is exuded, said orifice having a portion projecting outwardly from said wall, said projecting portion having an outer terminus, and a heat reflective shield having a longitudinal and extending surface positioned in coaxial surrounding relation to said outer terminus and spaced from said wall.

5. The glass melting chamber as described in claim 1 wherein an end portion of said shield is contiguous to said wall.

6. A glass melting chamber having a wall adapted to contain molten glass, said wall being fabricated of a high temperature-resistant refractory material and having an aperture provided therein, a high temperature and corrosion resistant metallic orifice member positioned in said aperture and having a bore through which molten glass is exuded, said orifice member having a terminal portion projecting outwardly from said wall, and a heat reflecting shield member having a longitudinal surface positioned in surrounding relation to and extending beyond said projecting terminal portion.

7. A glass melting chamber having a wall adapted to contain molten glass, said wall being fabricated of a high temperature-resistant metal, said well also having a projection extending externally of said chamber, said projection defining an orifice through which molten glass is exuded, and a heat reflective shield, fabricated of metal having high heat reflectivity and low heat emissivity as compared to said wall, in spaced and circumposing coaxial relation with said projection, said shield circumposing a longitudinal length of said projection, which length is greater than the thickness of metal comprising said shield.

8. A glass melting chamber having a wall adapted to contain molten glass, said wall being fabricated of a high temperature resistant refractory and having an aperture provided therein, a high temperature and corrosion-resistant metallic orifice member positioned in said aperture and having a bore through which molten glass is exuded, said orifice member having a portion projecting outwardly from said wall and said portion having a terminus spaced from said wall, a heat reflective shield fabricated of a metal of high reflectivity and low emissivity positioned in surrounding relation to said projecting portion, said shield extending beyond said terminus to protect the same from radiant energy emanating from said wall.

9. A glass melting chamber as defined in claim 8, wherein the heat reflective shield is fabricated of an alloy of platinum and rhodium.

10. A glass melting chamber having a wall adapted to contain molten glass, said wall being fabricated of a high temperature-resistant metal and having an orifice provided therein through which molten glass is exuded, said orifice having a portion projecting outwardly from said wall and said portion having terminus spaced from said wall, and a heat reflective shield fabricated of metal of high reflectivity and low emissivity positioned in surrounding coaxial relation to said projecting portion and having a lateral surface extending longitudinally beyond said terminus.

11. A glass melting chamber as defined in claim 7, wherein the heat reflective shield is fabricated of an alloy of platinum.

12. A glass melting chamber as defined in claim 7, wherein the heat reflecting shield is supported from said wall.

13. A glass melting chamber as defined in claim 10, wherein the heat reflecting shield is supported from said projecting portion of said orifice.

14. A glass melting chamber having a wall adapted to contain molten glass, said wall having an orifice therein through which molten glass is exuded, said orifice having a portion projecting outwardly from said wall, a heat reflective shield of high reflectivity and low emissivity positioned in surrounding relation to said projecting portion, said shield comprising a plurality of elongated heat reflective metal plates positioned in surrounding adjacent relation to said projecting portion, and said plates being positioned in planes parallel to the axis of said projecting portion and in abutting edge relation with said wall.

15. A glass melting chamber having a wall adapted to contain molten glass, said wall having an orifice therein through which molten glass is exuded, said orifice having a portion projecting outwardly from said wall, and a terminus on said projecting portion spaced from said wall, a heat reflective shield positioned in surrounding relation to said projecting portion, said shield comprising a tubular sleeve element positioned in coaxial relation to said orifice and extending a short distance beyond said terminus, and said sleeve element being secured in supporting relation from said projecting portion of said orifice.

16. A glass melting chamber having a wall adapted to contain molten glass, said wall having an orifice therein through which molten glass is exuded, said orifice having a portion projecting outwardly from said wall, and a terminus on said projecting portion spaced from said wall, a heat reflective shield positioned in surrounding relation to said projecting portion, said shield comprising a tubular sleeve element positioned in coaxial relation to said orifice and extending a short distance beyond said terminus, and said sleeve element being secured in supporting relation from said wall of said melting chamber.

17. A glass melting chamber having a wall adapted to contain molten glass, said wall having a plurality of projections extending externally of said chamber, each of said projections defining an orifice through which molten glass is exuded, and a metallic heat reflective shield for each of said projections, each of said shields circumposing the outer linear extremity of and being coaxial with its respective projection, said projections and said shields being of significant axial extent.

References Cited in the file of this patent

UNITED STATES PATENTS

| | | |
|---|---|---|
| Re. 24,060 | Russell | Sept. 6, 1955 |
| 2,121,802 | Kleist et al. | June 28, 1938 |
| 2,165,318 | Thomas et al. | July 11, 1939 |
| 2,489,508 | Stalego | Nov. 29, 1949 |
| 2,706,365 | Stalego | Apr. 19, 1955 |
| 2,767,519 | Bjorksten | Oct. 23, 1956 |
| 2,775,850 | Stalego | Jan. 1, 1957 |

FOREIGN PATENTS

| | | |
|---|---|---|
| 522,416 | Belgium | Sept. 15, 1953 |
| 449,233 | Germany | Sept. 7, 1927 |
| 436,250 | Great Britain | Oct. 7, 1935 |
| 452,810 | Great Britain | Oct. 31, 1936 |
| 605,001 | Great Britain | July 14, 1948 |
| 724,404 | Great Britain | Feb. 23, 1955 |